June 29, 1965  W. HOVEN  3,191,453
SINTERED METAL ARTICLE
Filed Nov. 14, 1962
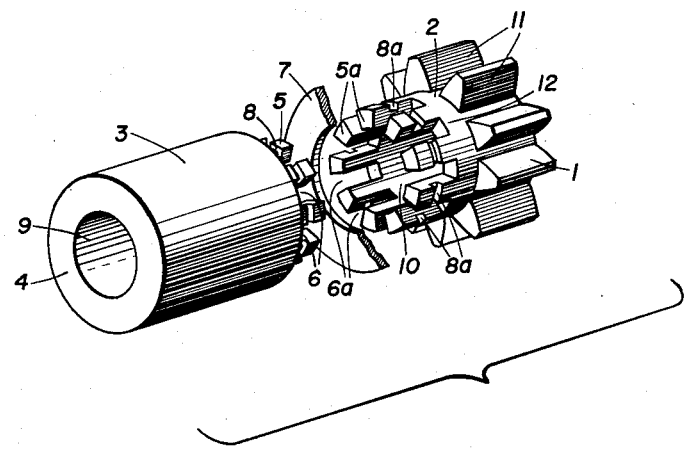
WILHELM HOVEN
INVENTOR.

United States Patent Office 3,191,453
Patented June 29, 1965

3,191,453
SINTERED METAL ARTICLE
Wilhelm Hoven, Wurselen, Germany, assignor to Garbe, Lahmeyer & Co., A.G., Aachen, Germany, a corporation of Germany
Filed Nov. 14, 1962, Ser. No. 237,526
Claims priority, application Germany, Nov. 14, 1961, G 33,582
2 Claims. (Cl. 74—432)

This invention relates to a sintered metal article and, more particularly, to a machine element, such as an engine starter gear, formed from powdered metal.

The manufacture of articles by the pressing and sintering of powdered metal has many advantages. By this method, fairly intricate parts may be made accurately and inexpensively. However, heretofore, the shapes that could be made from powdered metal have been limited by the nature of the pressing machinery. When the article had a groove or collar, the pressing operation could be carried out only by use of side-action elements which limited the pressures which could be used in pressing, slowed the cycle time, and were subject to considerable maintenance. A machine element which presents a particular problem in formation from powdered metal is the pinion gear of an automobile engine starter; this element consists of a gear at one end of a shaft and a groove formed in the shaft adjacent the gear. Such devices cannot be pressed from powdered metal with simple pressing equipment because of the difficulty of drawing. These and other difficulties experienced with prior art devices have been obviated in a novel manner by the present invention.

It is, therefore, an outstanding object of the invention to provide a sintered metal article which is generally elongated and which is provided with a recess extending tranversely thereof.

Another object of this invention is the provision of an article of elongated form with a substantial lateral recess, the article being formed from powdered metal which has been pressed and sintered.

A further object of the present invention is the provision of a sintered metal article having a groove capable of being formed on simple pressing equipment.

It is another object of the instant invention to provide a grooved article of pressed and sintered powdered metal, formed inexpensively but accurately.

With these and other objects in view, as will be apparent to those skilled in the art, the invention resides in the combination of parts set forth in the specification and covered by the claims appended hereto.

The character of the invention, however, may be best understood by reference to one of its structural forms, as illustrated by the accompanying drawing in which:

The single figure is a perspective view before assembly of an article embodying the principles of the present invention.

The article, indicated generally by the reference numeral 2, is shown as in the form of the pinion and shaft of an automobile starter mechanism. It consists of a pinion portion 1 having gear teeth 11 and a shaft portion 4 having a cylindrical surface 3 on which other parts of the starter mechanism are slidably mounted. An axial bore 9 extends through the shaft portion 4, while a bore 10 of the same size extends axially through the pinion portion 1. The portion 4 is provided with axially-extending teeth 5 having slots 6 therebetween; the pinion portion 1 is also provided with axially-extending teeth 5a with intervening spaces 6a. The teeth 5 and 5a extend toward one another and are staggered to fit tightly together. As is evident from the drawing, each of the teeth has radial side surfaces, so that the sets of teeth mesh and lock together to form a complete tube. The outer surface of this tube is indicated as a cylindrical surface 12 of substantially smaller diameter than the surface 3. Formed on each of the teeth 5 are grooves 8, while similar grooves 8a are formed on each of the teeth 5a; when the teeth are meshed, the separate grooves form a single continuous groove in which is locked a clamping ring 7. In this way, the two portions 1 and 4 are locked against relative rotational movement about the axis of the bores 9 and 10 and against axial movement by the ring 7.

Each of the portions 1 and 4 is separately formed from powdered metal. As is evident from a study of the shapes, each portion may be pressed in a suitable pressing machine and is capable of being pushed from the pressing die without difficulty. Each portion is then sintered in a furnace in the well-known manner to lock the powdered metal particles together. The formation of the gear teeth 11 to the considerable accuracy required is accomplished readily by pressing powdered metal in a suitable die. If one attempted to form the entire pinion portion 11 in one pressing and sintering operation, the presence of the reduced surface 12 and the groove 8 would render such an attempt difficult, if not futile.

It can be seen, then, that by use of the present construction, in which elongated machine elements with transverse recesses are formed from powdered metal in two parts, it is possible to manufacture such articles inexpensively. This construction is particularly appropriate where the element has surfaces conforming to a shape dictated by a mathmetical formula that otherwise would need to be accurately machined at a high cost attributable to the use of skilled labor and expensive machine tools.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A machine element, comprising
   (a) a first portion formed from pressed and sintered powdered metal having a plurality of locking teeth,
   (b) a second portion formed from pressed and sintered powdered metal having a plurality of locking teeth, the portions being assembled with the locking teeth in inter-engaging relationship, and
   (c) means locking the portions together, the assembled first and second portions forming an elongated generally-cylindrical shape with enlarged parts at the ends and a reduced portion in the center where the locking teeth are located.

2. A machine element, comprising
   (a) a first portion formed from pressed and sintered powdered metal having a plurality of locking teeth,
   (b) a second portion formed from pressed and sintered powdered metal having a plurality of locking teeth, the portions being assembled with the locking teeth in inter-engaging relationship, and (c) means locking the portions together, each locking tooth being wedge-shaped and the locking teeth locking together to form a tube.

References Cited by the Examiner

UNITED STATES PATENTS

| | | | |
|---|---|---|---|
| 754,043 | 3/04 | Bradley | 287—104 X |
| 1,231,321 | 6/17 | Alden et al. | 74—447 |
| 2,331,909 | 10/43 | Hensel et al. | 74—460 |
| 2,386,048 | 10/45 | Harkness | 29—159.2 |
| 2,457,942 | 1/49 | Van Zandt | 74—432 |
| 2,857,777 | 10/58 | Porter | 74—432 |

FOREIGN PATENTS 742,963   1/56   Great Britain.

DON A. WAITE, *Primary Examiner.*